United States Patent
Auchmann (10) Patent No.: US 10,152,952 B2
(45) Date of Patent: Dec. 11, 2018

(54) METHOD AND SYSTEM FOR THE SAFE VISUALIZATION OF SAFETY-RELEVANT INFORMATION

(71) Applicant: Matthias Auchmann, Vienna (AT)

(72) Inventor: Matthias Auchmann, Vienna (AT)

( * ) Notice: Subject to any disclaimer, the term of this patent is extended or adjusted under 35 U.S.C. 154(b) by 178 days.

(21) Appl. No.: 14/982,877

(22) Filed: Dec. 29, 2015

(65) Prior Publication Data
US 2016/0189687 A1  Jun. 30, 2016

(30) Foreign Application Priority Data
Dec. 30, 2014 (EP) ..................... 14004441

(51) Int. Cl.
| | | |
|---|---|---|
| *G06F 11/07* | (2006.01) | |
| *G06F 11/16* | (2006.01) | |
| *G06T 1/60* | (2006.01) | |
| *G09G 3/20* | (2006.01) | |
| *G09G 5/36* | (2006.01) | |
| *G09G 5/377* | (2006.01) | |

(52) U.S. Cl.
CPC ......... *G09G 5/377* (2013.01); *G06F 11/0763* (2013.01); *G06F 11/0796* (2013.01); *G06F 11/162* (2013.01); *G06T 1/60* (2013.01); *G09G 3/20* (2013.01); *G09G 2340/12* (2013.01); *G09G 2380/12* (2013.01)

(58) Field of Classification Search
None
See application file for complete search history.

(56) References Cited

U.S. PATENT DOCUMENTS

| | | | |
|---|---|---|---|
| 2006/0284976 A1* | 12/2006 | Girgensohn | G06F 17/30811 348/135 |
| 2007/0132779 A1* | 6/2007 | Gilbert | G05B 19/0426 345/619 |
| 2007/0162617 A1* | 7/2007 | Bates | H04N 1/00795 709/247 |

(Continued)

FOREIGN PATENT DOCUMENTS

| | | |
|---|---|---|
| DE | 3411015 | 9/1985 |
| DE | 102012207439 | 11/2013 |

(Continued)

OTHER PUBLICATIONS

Auchmann, Matthias; European Office Action for serial No. 14004441.3, filed Dec. 30, 2014, dated Jun. 9, 2015, 5 pgs.

(Continued)

*Primary Examiner* — Said Broome
*Assistant Examiner* — Yu-Jang Tswei
(74) *Attorney, Agent, or Firm* — Taylor English Duma LLP (57) ABSTRACT

A method for the safe visualization of a safety-relevant information includes the steps of:
  for all possible states of at least one variable input parameter, decomposing a safe visualization of the at least one variable input parameter into its safe base elements (31);
  for each of the decomposed safe base elements, enumerating and storing a set of all possible states of safe base element visualization (32); and
  for each of the decomposed safe base elements, transmitting the set of all possible states of safe base element visualization to a target system that provides safe visualization at runtime (33).

18 Claims, 7 Drawing Sheets

(56) References Cited

U.S. PATENT DOCUMENTS

| | | | | |
|---|---|---|---|---|
| 2007/0188494 | A1* | 8/2007 | Agutter | G06F 17/30554 345/440 |
| 2008/0155437 | A1* | 6/2008 | Morris | G06F 9/4443 715/765 |
| 2010/0079488 | A1 | 4/2010 | McGreevy et al. | |
| 2012/0098842 | A1* | 4/2012 | Manz | G06F 11/263 345/522 |
| 2012/0308107 | A1* | 12/2012 | Engel | A61B 6/025 382/131 |
| 2013/0080978 | A1* | 3/2013 | Kakde | G06Q 10/06 715/854 |
| 2014/0161367 | A1* | 6/2014 | Ridenour | H04N 19/115 382/233 |
| 2014/0278117 | A1* | 9/2014 | Dobin | G01V 1/345 702/16 |
| 2015/0302827 | A1* | 10/2015 | Danielsson | G01C 23/00 345/581 |
| 2016/0042024 | A1* | 2/2016 | Campanotti | G06F 17/30371 707/694 |

FOREIGN PATENT DOCUMENTS

| | | |
|---|---|---|
| DE | 102012208481 | 11/2013 |
| EP | 2273369 | 1/2011 |
| EP | 2439722 | 4/2012 |
| EP | 3040862 | 7/2016 |
| WO | 2011003872 | 1/2011 |

OTHER PUBLICATIONS

Auchmann, Matthias; Decision to Grant for serial No. 14004441.3, filed Dec. 30, 2014, dated Jan. 27, 2017, 2 pgs.

Auchmann, Matthias; European Office Action for serial No. 14004441.3, filed Dec. 30, 2014, dated Jul. 22, 2016, 5 pgs.

Auchmann, Matthias; European Search Report for serial No. 14004441.3, filed Dec. 30, 2014, dated May 21, 2015, 3 pgs.

* cited by examiner

METHOD AND SYSTEM FOR THE SAFE VISUALIZATION OF SAFETY-RELEVANT INFORMATION

REFERENCE TO RELATED APPLICATIONS

This application claims priority to European Patent Application No. 14004441.3, filed Dec. 30, 2014, which is hereby specifically incorporated by reference in its entirety.

FIELD OF THE INVENTION

The present invention relates to a method and a system for the safe visualization of safety-relevant information on a display, wherein a safe visualization of at least one variable input parameter is generated using safe overlays.

BACKGROUND OF THE INVENTION

Currently, displays are used increasingly as display units in many applications, in control and monitoring systems for example. In addition to these cases, displays are more commonly used to display safety-relevant information in the field of train-control or airplanes, for instance. Generally units of this kind are based on a microcontroller or a personal computer equipped with software running on an operating system.

Therein, a display failure is considered to be a safety-relevant failure if the display only seems to work well or seems to show the correct information, but actually does not represent the correct information provided to the display unit, for example does not show the train's current speed. The display only shows a seemingly correct value, the failure, however, cannot be detected as such by an observer.

Common methods and apparatuses for the application of methods for a safe visualization of safety-relevant information are based on the assumption that the display failure results in an obviously false image and thus is apparent to the observer. For example, the displayed data may be scrambled, may change color, a figure may be incomplete or shown in a distorted shape, such that the observer can clearly see that something is wrong.

DE 3411015 A1 discloses a method for the safe visualization of safety-relevant information, wherein an input parameter is transformed into a sequence of image data representing the input parameter and the sequence of image data is transmitted to a display. Further, a checksum is calculated for the sequence of image data and compared to a reference checksum and a safety-focused reaction is provided, if the checksum is not identical to the reference checksum.

However, considering a simple speedometer with 24 bits of pixel depth, showing for example a train's current speed, minimum speed, maximum speed and target speed, which has four sources of input, if each of these sources has 10 bits of resolution, the speedometer would have a total of $2^{40}$ possible states. Further, if each checksum would have four bytes, the checksum data alone would amount to a total of 4 Tera bytes of checksum data, which would be much more than any current embedded system provides. An exemplary speedometer visualization can be found in modern train GUIs (graphical user interfaces) as described in the ERA ERTMS standard for "ETCS Driver Machine Interface" of the European Train Control System (ETCS), or in similar complexity across industries in modern applications.

Even if an embedded system could feature such a huge amount of memory, the precalculation of checksums would be impractical. Considering that 10 checksums could be calculated on a personal computer per second, it would take at about 3487 years to calculate $2^{40}$ reference checksums, which would be unacceptable.

SUMMARY OF THE INVENTION

It is an object of the present invention to provide an improved method for the safe visualization of safety-relevant information on a display.

The present invention provides a method for the safe visualization of safety-relevant information. Therein, the method comprises the following:

In a first step, for all possible states of at least one variable input parameter, a safe visualization of the at least one variable input parameter is decomposed into its safe base elements, its safe overlays, wherein each of the safe base elements can either be static or represent the visualization information of at least one variable input parameter.

As a second step, for each of the decomposed safe base elements and, therefore, for each of the safe overlays, a set of all possible states of safe base element visualization is enumerated and stored in a suitable format wherein the set of all possible states of safe base element visualization comprises the visualization of a safe base element within safe visualizations of the at least one variable input parameter for all possible states of the at least one variable input parameter. For example, assuming that the at least one variable input parameter includes a train's current speed, then the visualizations of all possible states of the train's current speed are enumerated and stored in a suitable format.

In a third step, for each of the decomposed safe base elements and, therefore, for each safe overlay, the set of all possible states of safe base element visualization is transmitted to a target system that provides the safe visualization at runtime.

In a fourth step, for each of the at least one variable input parameter an actual state of the at least one variable input parameter is inputted into the target system, and for each variable input parameter the corresponding safe base element, the safe overlay, and its correct state are determined, for example looked up in the respective set of all possible states of safe base element visualization.

In a fifth step, each corresponding safe overlay, in particular the visualization of each corresponding safe base element, is rendered, one after the other, one overlaying the previous. This fifth step, in particular the rendering and overlaying of the correct safe base element state, safely generates the original safe visualization of the actual state of the at least one variable input parameter, which is then displayed on a display.

The method is based on decomposing the visualization of one or multiple input parameters into its base elements. For example, for a simple speedometer, showing for example a train's current speed, minimum speed, maximum speed and target speed, the visualization of four parameters in one rectangular area is decomposed in four comparably simple visualizations, one for each of the input parameters, thereby simplifying the problem. The sets of decomposed base element visualizations can then be safely rendered on top of each other, thereby transforming a multiplicative problem into an additive problem and thus reducing the amount of possible visualization states. In particular, separate simpler visualizations are reassembled by overlaying safe overlays to reproduce the original visualization from the simple set of base elements. Therein, the term overlay is introduced because the individual base elements usually need to be rendered on top of each other in a specific z-order to yield the original visualization, wherein one element overlays another.

Therein, rather than using checksums for each possible state of the original visualization for verification purposes, the decomposed image data can be used directly and rendered safely. In particular, the safe visualization is decomposed in the respective sources, which can already be realized at design time during a development process. Therein, one base element visualization is stored after the other thereby forming overlays, each of which is later, at runtime, displayed on top of the other, thereby generating a safe visualization of the at least one variable input parameter. Further, each possible state of a base element visualization may be transformed prior to being stored to reduce the amount of required storage capacity for the image overlay. The transformation to reduce the storage requirement might be a compression algorithm, or storing the base element visualization particularly efficiently, such as storing it in a vector graphics format. Therefore, for a simple speedometer at 32 bits RGBA pixel depth, showing for example a train's current speed, minimum speed, maximum speed and target speed, with four input parameters and, therefore, four sources of input, wherein the safety critical data are possible visualization states of the four input parameters, using image compression as the transformation and assuming a compressed 25 k bytes for the static base image overlay and roughly 3 k bytes of compressed data per base element visualization, with each input parameter being a 10 bit input, a total storage of 25 k bytes+$2^{10}$*3 k bytes+$2^{10}$*3 k bytes+$2^{10}$*3 k bytes+$2^{10}$*3 k bytes and, therefore, a total amount of roughly 12 Mega bytes is required. The assumption for the compressed sizes as stated above can easily be attained with known compression algorithms. When using other forms of transformation before storing the image data of the possible states, such as for example vector graphics, the achieved compression could even be much better. If this is compared with the common method of computing checksums of all of the $2^{10+10+10+10}=2^{40}$ visualization states of the original safe visualization, assuming that each checksum has 4 Bytes, the storage requirement would amount to 4 Tera bytes of checksum data, which is roughly 349525 times worse than the 12 Mega bytes of data storage requirement.

The last calculation further indicates the benefits of the present invention, namely transforming the safe visualization problem into an additive representation by suitable means rather than using the common multiplicative problem representation, yielding a drastic reduction in states of the visualization. At the beginning of computing time for the design time, indeed the decomposition of the visualization, the enumeration of all states for each overlay and the transformation and storing of data for the overlays in a compressed form or a specific format may take longer than the calculation of checksums for a single image, however considering a personal computer executing 1 decomposition and suitable transformation and storage operation (e.g. compression or vector graphics representation) per second, for the simple speedometer as described above a computing time of 4097 seconds is required for the extraction of all data. For currently known solutions, the enumeration step would still have to be performed, and even if checksum calculations may be faster and the same personal computer would be ten times faster for the calculation of checksums, being able to calculate 10 checksums per second, a computing time of roughly 3487 years for calculating $2^{40}$ checksums would still be needed, which is due to the huge amount of states in the original visualization, if the visualization problem is not decomposed and thus broken down. To the contrary, a runtime lookup of the respective base element visualization of the at least one variable input parameter and a corresponding inverse transformation and rendering of the inversely transformed state of each base element visualization is indeed more computationally expensive than the mere calculation of a checksum, however it is easily doable with modern processors or FPGAs, even at frame rates matching the frame rates of modern LCDs (liquid crystal displays). So the runtime computing power requirements are higher, but easily within the limits of modern hardware.

Therefore, an improved method for the safe visualization of complex safety-relevant information on a display concerning storage requirement and design time computing time is provided. Also the method is not restricted to a speedometer represented as RGBA image data, rather all possible forms of visualization in various color spaces or data representations are conceivable. By the method of the present invention arbitrary and complex visualizations can be used, since they can be simplified very efficiently yet in a generic way. Also, whilst the actual reconstruction of the original visualization at runtime is well suited to how modern GUI libraries use z-order and alpha blending and/or alpha masking to implement the visualization in the first place, the needed hardware and/or software complexity is drastically reduced in comparison to modern GUI libraries and their underlying operating system and the required hardware. Therefore, the method is sufficiently simple to implement such that it can even be offloaded to small embedded processing units, such that the safety relevant part of the method is reasonably small and thus easily certifiable, yet capable of virtually all common visualizations as accomplished by full blown personal computers with complex hardware and software. Further, the method can be used for improving graphics rendering performance, too, without any safety background.

Therein, the set of all possible states of safe base element visualization can be stored for example as an image in a color space such as RGBA (Red Green Blue Alpha), what is a common color space for computerized images, wherein the alpha channel enables pixels to be transparent, translucent and opaque. The set of all possible states of safe base element visualization generated by decomposing the safe visualization might also be optionally transformed in a suitable way before storing it, for example compressed. Further, the set of all possible states of safe base element visualization generated by decomposing the safe visualization can be stored in the z-order (the ordering of overlapping two-dimensional objects in a visualization) in which they occur in the original safe visualization. The first and second steps are usually, but not necessarily, performed once for a given GUI (Graphical User Interface) visualization, and are usually but not necessarily performed at design time. Therein, correct safe base element state can be overlaid in the z-order in which they were stored in the second step. Furthermore, if an image format capable of translucent or transparent pixels, an overlaying means for performing the overlaying needs to implement alpha blending. Alpha blending is the process of combining a translucent foreground pixel color with a background pixel color, thereby producing a new blended color for the resulting pixel. Optionally, the overlay can also be processed by implementing alpha masking. Alpha masking is the process of applying an additional binary alpha mask per overlay, in particular if the overlay depends on two or more variable input parameters. Since an alpha mask has one bit per pixel only, it is fast and efficient to store, yet can simplify some kinds of visualization significantly, especially when the alpha mask to be applied can depend on one or more variable input parameters. Therein, the optional inverse transformation needs to be done to reverse the transformation performed when storing the set of all possible states of safe base element visualization generated by decomposing the safe visualization, if such a transformation was done, and could consist of the decompression of an RGBA image. Also, a design time decomposing system for decomposing the visualization base elements at design time and the target system can be separate devices or can be integrated in the same device, thus being parts of a single device.

In some embodiments, for all possible states of the at least one variable input parameter there might also be non-safety critical data to be displayed, wherein the non-safety critical data is transmitted to the display unit and wherein the technique of inputting at least one variable input parameter into the target system, determining the corresponding safe overlays of the at least one variable input parameter and looking up the correct state in the set of all possible states of safe base element visualization, and successively rendering each safe overlay, e.g. the visualization of each safe base element, one after the other, one overlaying the previous, finally yielding the complete safe visualization of the at least one variable input parameter, comprises the following: The non-safety critical data is rendered first. Then the non-safety critical data is successively overlaid by the safe overlays, by successively rendering each safe overlay, e.g. the visualization of each safe base element, one after the other, one overlaying the previous, finally yielding the complete safe visualization of the at least one variable input parameter. This results in a further reduction of storage requirement and computing time, since the non-safety critical data for example does not have to be decomposed and stored. Therein, the non-safety critical data may comprise non-safety critical content, for example a background color or buttons with rounded or transparent corners. Whilst background colors or rounded corners that are overlaid with safety relevant information are very common examples of non-safety critical parts of safe visualizations, it might also be conceivable in certain scenarios that non-safety critical data is used in overlays with z-orders other than 0. Further, the non-safety critical data might also be transmitted to the target system and displayed at the suitable z-order.

Therein, non-safety critical visualization elements might be decomposed and transformed and processed in the same way as the safe base elements, too. This might be done in order to improve architectural purity or if it is beneficial from a performance point of view.

Further, in some embodiments, a compression algorithm is used as the transformation step for the elements of the set of all possible states of safe base element visualization generated by decomposing the safe visualization to separately compress the image data, and a corresponding decompression algorithm is used as the inverse transformation at runtime. The compression algorithm can be a lossless compression algorithm, in particular a compression algorithm that allows the original data to be perfectly reconstructed from the compressed data, but might also be a lossy data compression algorithm, in particular an algorithm that permits reconstruction of an approximation of the original data, as commonly used for image or video data, if safety is not significantly affected. This means that the method of inputting at least one variable input parameter, determining the corresponding safe base elements of the at least one variable input parameter and looking up the correct state in the set of all safe base elements generated by decomposing the safe visualization and successively rendering each safe overlay, e.g. the visualization of each safe base element, one after the other, one overlaying the previous, finally yielding the complete safe visualization of the at least one variable input parameter, further comprises the steps of decompressing the data for each safe overlay before rendering it as the inverse transformation. File compression utilities, which are programs that apply a file compression algorithm to form one, to any number of files, and create an archive file, are known in the art and are, therefore, quite easy to implement. Conventional file compression utilities have an extraction feature that uses the algorithm originally used to compress and create the archive, in order to properly extract and recover the files from the archive and, thus, these conventional file compression utilities can be used in order to compress each of the elements of the set of extracted safety critical data. Further, file compression utilities are capable of placing multiple files into one archive file, with a file size smaller than the sum of the files within it and, thus, the amount of required storage capacity can be further reduced. Also, there are compression algorithms known in the art that are specifically efficient when used with image data.

As an example of a lossless image compression algorithm that is well suited for image data and also particularly easy and efficient to implement on an embedded system, the compression algorithm can be a color lookup-table algorithm with run-length encoding, in order to successively compress the respective elements. In coding theory, a lookup-table is commonly used to hold frequently occurring longer symbols in the original data, replacing the longer symbols in the original data by shorter lookup table indices, thereby compressing the original data. In the case of image data, colors are a suitable candidates to be used as the symbols in lookup-tables. Run-length encoding is a very simple form of data compression in which runs of data are stored as a single data value and count, rather than as the original run. This is most useful on data that contains many such runs, for example simple graphic images such as icons, line drawings, for example the numbers and letters on the projected dial of a conventional speedometer. Therefore, since most image data, especially for the overlays, has mostly transparent pixels, using a color-lookup table for each overlay and combining it with run-length encoding is a very efficient technique, usually resulting in overall compression rates of 10% of the original data for the base image, and about 2% for a typical overlay. Further, such an algorithm can easily be implemented in hardware and is feasible for both, general purpose processors and FPGAs.

Further, in some embodiments, the transformation step for the set of all possible states of safe base element visualization may be to convert each element of the set of all safe base elements generated by decomposing the safe visualization in a vector graphics format, which is particularly efficient in terms of storage requirements, and can also be efficiently implemented as the inverse transformation in the rendering stage at runtime.

Further, the third step of transmitting the decomposed, optionally transformed and stored safe base elements and, therefore, safety-critical data might include ways to assure the data integrity of the transmitted data, by known techniques such as signatures or transmission checksums.

In some embodiments, the third step of transmitting the decomposed, and stored safe base elements might include a safety relevant inspection or verification step for the stored data, e.g. by manual, semi-automatic or automatic inspection. This is meant to enhance safety, serve as a so called safety barrier, or to introduce safety by some kind of inspection, in particular a safety barrier crossing from a non-safe to a safe domain. During this inspection/verification step signatures for authenticity might be added.

Also color spaces being capable of translucent and transparent pixels may be used in the second step. In those embodiments, an overlaying means for overlaying the safe overlays needs to implement alpha blending. Alpha blending is the process of combining a translucent foreground pixel color with a background pixel color, thereby producing a new blended color for the resulting pixel.

Optionally, each overlay can also be processed by implementing alpha masking. Alpha masking is the process of applying an additional binary alpha mask per overlay, in particular if the overlay depends on two or more variable input parameters. Since an alpha mask has one bit per pixel only, it is fast and efficient to store, yet can simplify some kinds of visualization significantly, especially when the alpha mask to be applied can depend on one or more variable input parameters.

Furthermore, the z-order used for overlaying the data, may not be pre-defined or fixed, but might be a configuration option or might even depend on variable input parameters and thus change at runtime. For example, if a train's current speed exceeds a predefined value, the corresponding visualization and, therefore, the corresponding safe base element can be displayed on top of the other safe base element visualizations.

Further, the image data and, therefore, each element of the set of all possible states of safe base element visualization may be stored separately. Herein, separately stored means that each element may be stored in a separate area of a safe memory, for example a nonvolatile memory, which is computer memory that can retain stored information even when not powered. By separately storing each element of the set of all possible states of safe base element visualization the access time for reading each element of the set of all safe base elements generated by decomposing the safe visualization can be shortened. The access time is the time a computing device requires accessing the file for example, for reading or writing.

Although the safe visualization of the actual state of the at least one variable input parameter can be generated by optionally successively inversely transforming and then rendering and overlaying the safe base elements, the overlays, of the decomposed original safety critical data, in some embodiments the method may further comprise the following: Each of the required safe base element visualizations is compared with a version of the respective safe base element of the set of all possible states of safe base element visualization which is effectively displayed on a display. Further, a safety focused reaction is provided, if at least one of the required safe base element visualizations is not identical to the version of the respective safe base element that is effectively displayed on the display. Therein, the comparison can be carried out in one of many suitable ways, for example by pixelwise comparison, e.g. pixel by pixel, or for relevant parts of the pixel data such as for only certain color components, or by calculating checksums of the expected and the actual overlays, and comparing the checksums, or by doing some kind of pattern matching. By checking an element of the set of all possible states of safe base element visualization against a version of the respective element of set of all possible states of safe base element visualization which is effectively displayed, if necessary admitting a tolerance, and providing a safety focused reaction if an expected overlay is not identical to the version of the respective overlay which is effectively displayed, a highly efficient and safe visualization architecture with two channels is introduced, where the forward channel does the actual visualization and the verification channel provides or enhances the integrity in a safety relevant way by comparing the current visualization with the expected visualization. If access to the separate base element renderings or overlays of the forward channel is not available to the verification channel, the verification channel can render the visualization of the at least one variable input parameter by successively rendering and overlaying the safe base elements, the overlays, of the decomposed original safety critical data into a shadow buffer, and can then compare the resulting visualization with what is actually being displayed, again by a suitable comparison means, such as some kind of pixelwise comparison, checksum comparison or pattern matching, for example.

Therein, the safety-focused reaction may be to switch the display off. Therein, the display may be switched off completely or to a certain extent. However, all methods that clearly indicate a safety critical failure to an observer are suitable as a safety-focused reaction, for example providing data marking, masking or distortion or switching off the HMI.

A system for the safe visualization of a safety-relevant information is also provided, providing a first means which comprises a decomposition means to perform the first step, in particular for all possible states of at least one variable input parameter decomposition of the safe visualization of the at least one variable input parameter into its safe base elements, the safe overlays, and an enumerating, transforming and storing means to perform the second step, in particular enumerating, optionally transforming and then storing all possible states of each overlay in a set of all possible states of safe base element visualization.

A second means implements the third step and comprises a transmitting and an optional inspection means.

A third means features an input of at least one variable input parameter, implements an input parameter processing and comprises a determining means for determining for each of the at least one variable input parameter the corresponding safe base elements, the safe overlays, and its correct state depending on an actual state of the at least one variable input parameter, and an overlaying means, optionally inversely transforming and then rendering one safe base element after the other, one overlaying the previous, for example in the z-order in which they were stored, if necessary using alpha-blending and/or alpha masking. Also, the third means comprises a displaying means, to display the resulting visualization.

The system with its three means thereby generates a safe visualization of the at least one variable input parameter. The first means might for example be a personal computer, the second means might be a storage volume, such as a USB stick, an SD card, a NAND flash or a hard disk, or some kind of direct connection, for example Ethernet or WLAN, and the data to be transmitted might optionally be inspected by an optional further personal computer which might open and display the transmitted data from the storage volume or before or during the transmission via the direct connection. The third means might be an HMI of some kind, usually an embedded system featuring a processor or an FPGA or both, and a TFT display, as commonly found in industrial, train, car and airplane applications, but might also be a personal computer.

In some embodiments, a system that combines all three means into one powerful computing unit performing all of the above steps is used.

Thus, the presented system for the safe visualization of safety-relevant information is based on decomposing the visualization of at least one variable input parameter into its base elements, the overlays, thereby also decomposing the problem. The sets of decomposed base element visualizations can then be safely rendered on top of each other at runtime, thereby transforming a multiplicative problem into an additive problem and thus reducing the amount of possible visualization states. Rather than using checksums to verify the visualization for each possible state of the original visualization, the decomposed image data is used directly and either rendered safely in a safe computing unit, or used in combination with some kind of pixelwise comparison, pattern matching or checksums for verification purposes, but for the now reduced amount of visualization states of the decomposed problem rather than the original possibly huge amount of visualization states. The problem decomposition is well suited to how GUI libraries use z-order and alpha blending and/or alpha masking to implement the visualization in the first place, and can be realized in a small and simple safety relevant unit to do the rendering, or in a 2-channel architecture in the verification channel to add or enhance safety. Further, each possible state of safe base element visualization may be transformed prior to being stored to reduce the amount of required storage capacity for the image overlay. The transformation to reduce the storage requirement might be a compression algorithm, or storing the base element visualization particularly efficiently, such as storing it as a vector graphics. Therefore, for a simple speedometer at 32 bits RGBA pixel depth, showing for example a train's current speed, minimum speed, maximum speed and target speed, with four input parameters and, therefore, four sources of input, wherein the safety critical data are possible visualization states of the four input parameters, using image compression as the transformation and assuming a compressed 25 k bytes for the static base image overlay and roughly 3 k bytes of compressed data per base element visualization, with each input parameter being a 10 bit input, a total storage of 25 k bytes+$2^{10}$*3 k bytes+$2^{10}$*3 k bytes+$2^{10}$*3 k bytes+$2^{10}$*3 k bytes and, therefore, a total amount of roughly 12 Megabytes is required. When using other forms of transformation before storing the image data of the possible states, such as for example vector graphics, the achieved compression would even be much better. If this is compared with the common method of computing checksums of all of the $2^{10+10+10+10}=2^{40}$ visualization states of the original safe visualization, assuming that each checksum has 4 Bytes, the storage requirement would amount to 4 Terabytes of checksum data, which is roughly 349525 times worse than the 12 Megabytes of data storage requirement. The last calculation clearly shows the benefits of the presented system for the safe visualization of safety-relevant information, not only making the system more efficient by a huge factor, but also enabling safe visualizations that would have previously been impossible. Further, the system is sufficiently simple to implement such that it can even be offloaded to small embedded processing units, and such that the safety relevant part of the method is reasonably small and thus easily certifiable.

In some embodiments, there may also be non-safety critical data included in the visualization, wherein the non-safety critical data is transmitted to the third means of the system by the transmitting means, and wherein the system further comprises a means of incorporating non-safety critical visualization data into the visualization data that is being displayed on the display. This task might be accomplished by either rendering the transmitted non-safety critical data first and then overlaying the safety critical overlays, or by incorporating the non-safety critical data into the overlaying step at z-orders other than 0. As an alternative, in order to improve architectural purity, or as a performance enhancement, non-safety critical visualization elements might be decomposed and transformed and processed much in the same way as safe visualization elements. Taking a system that operates in a train as an example, the speedometer might show safe visualization data, but it might share the screen with air condition temperature and a text showing for example the name of the next station, with the latter two being non-safety critical. This non-safety critical data might be transmitted to the third means from an external system, or the third means itself, for example a modern HMI computer, may consist of both a non-safety relevant part, such as a processing system, and a safety relevant part, such as a safe display controller implemented for example in an FPGA or yet another processor, with the non-safety relevant part rendering the air condition temperature and the next station text, and the safety relevant part overlaying the safety relevant speedometer. Therein, the non-safety critical part of the system, might provide background colors or may provide background visualization that shine through rounded corners of even safety relevant visualizations such as a rectangular safe speedometer, wherein the safe speedometer is rendered overlaid on top of the non-safety critical data by the safety relevant part of the system, but the corners of the rectangular safe speedometers may contain transparent and translucent data, wherein the alpha-blending in the overlaying part of the method allows for the non-safety critical data to shine through. Using alpha blending during overlaying as described allows for very complex scenarios of non-safety relevant and safety relevant data to be mixed. Also, alpha masking could optionally be used to cut out or let shine through only specific parts of the nonsafe background, with the alpha mask even depending on one or more variable input parameters.

The safe part of the third means might also be realized as a part of an external graphics controller, a part of a graphics controller integrated into a display unit or as a standalone device, too.

The nonsafe and the safe part might not only be incorporated into the third means altogether however might also be implemented in one processing unit with other means of separating the nonsafe and the safe visualization, such as for example by software partitioning methods.

In some embodiments, the first means comprises a first storage unit, wherein the enumerating, transforming and storing means uses a compression algorithm stored in the first storage unit for separately compressing each possible state of each overlay prior to storing it. Further, the overlaying means uses a respective decompression algorithm, which is in particular the respective inverse transformation of the used compression algorithm, stored in a second storage unit within the third means, for decompressing the compressed possible states of each overlay prior to overlaying the rendered safe base elements. File compression utilities, which are programs that apply a file compression algorithm to form one, to any number of files, and create an archive file, are known in the art and are, therefore, quite easy to implement. Conventional file compression utilities have an extraction feature that uses the algorithm originally used to compress and create the archive, in order to properly extract and recover the files from the archive and, thus, these conventional file compression utilities can be used in order to compress each of the decomposed safe base elements. Further, file compression utilities are capable of placing multiple files into one archive file, with a file size smaller than the sum of the files within it and, thus, the amount of required storage capacity can be further reduced. Also, there are compression algorithms known in the art that are specifically efficient when used with image data.

As an example of a lossless image compression algorithm that is well suited for image data and also particularly easy and efficient to implement on an embedded system, the compression algorithm of which code is stored in the first storage unit can be a color lookup-table algorithm with run-length encoding, in order to successively compress the respective elements. In coding theory, a lookup-table is commonly used to hold frequently occurring longer symbols in the original data, replacing the longer symbols in the original data by shorter lookup table indices, thereby compressing the original data. In the case of image data, colors are suitable candidates to be used as the symbols in lookup-tables. Run-length encoding is a very simple form of data compression in which runs of data are stored as a single data value and count, rather than as the original run. This is most useful on data that contains many such runs, for example simple graphic images such as icons, line drawings, for example the numbers and letters on the projected dial of a conventional speedometer. Therefore, since most image data, especially for the overlays, has mostly transparent pixels, using a color-lookup table for each overlay and combining it with run-length encoding is a very efficient technique, usually resulting in overall compression rates of 10% of the original data for the base image, and about 2% for a typical overlay. Further, such an algorithm can easily be implemented in modern hardware and is feasible for both, general purpose processors and FPGAs.

For all possible states of the at least one variable input parameter there might also be non-safety critical data to be displayed, too.

In some embodiments, the third means comprises a third nonvolatile storage unit for storing the transmitted safe base elements and a fourth storage unit for storing the non-safety critical data. There can be further a graphics controller, which manages the third nonvolatile storage unit as well as the fourth storage unit, in order to switch a graphics data stream between the non-safety critical data and the safety critical overlays. In particular, the safe graphics controller is connected to the nonvolatile memory, which contains the compressed overlay image data and to the fourth storage unit, which might be a non-safe system and contains non-safety critical data. Therefore, the safe graphics controller can manage the safe overlays itself, separating safe and non-safe data in the display memory, and displaying safe data on top of the non-safe data. Therein, each of the elements of the set of all possible states of safe base element visualization, in particular each of the possible states of each overlay can be stored in a separate area of the third nonvolatile storage unit, in order to fasten the access time for reading each safe base element visualization from the third nonvolatile storage unit, and to facilitate the implementation.

Further, in some embodiments, the storage unit comprises a fifth storing unit, which comprises a non-safe part for storing non-safety critical data and a safe part for storing the safe base elements. Since most non-safe systems have their own nonvolatile memory, this nonvolatile memory can be used and the non-safe system can deliver the safe overlay data on request. Therefore, compared with two different storage units for the non-safety critical data and the safety critical data, this solution is cheaper in terms of hardware costs, but requires additional computational complexity, in order to eliminate the safe nonvolatile memory for the safety critical data. There can be a safe graphics controller, too, in order to manage the graphics data stream. In particular, the safety critical data can be encrypted with an encryption key known to the safe graphics controller only, or some other means for ensuring data integrity. Therefore, the non-safe system can be a feasible supplier of safe data, adding the cost of increased computational and algorithmic complexity, but saving one hardware component. If the non-safe system does not fulfill its duty of providing the safe overlay data in a timely manner, the safe graphics controller could still switch to a safe state, for example blanking the display or activating some other safety function, in order to achieve its safety goal and, therefore, the safe visualization of the safety-relevant information.

BRIEF DESCRIPTION OF THE DRAWINGS

Embodiments of the invention will now be described with reference to the drawings.

DETAILED DESCRIPTION

Figure 1:
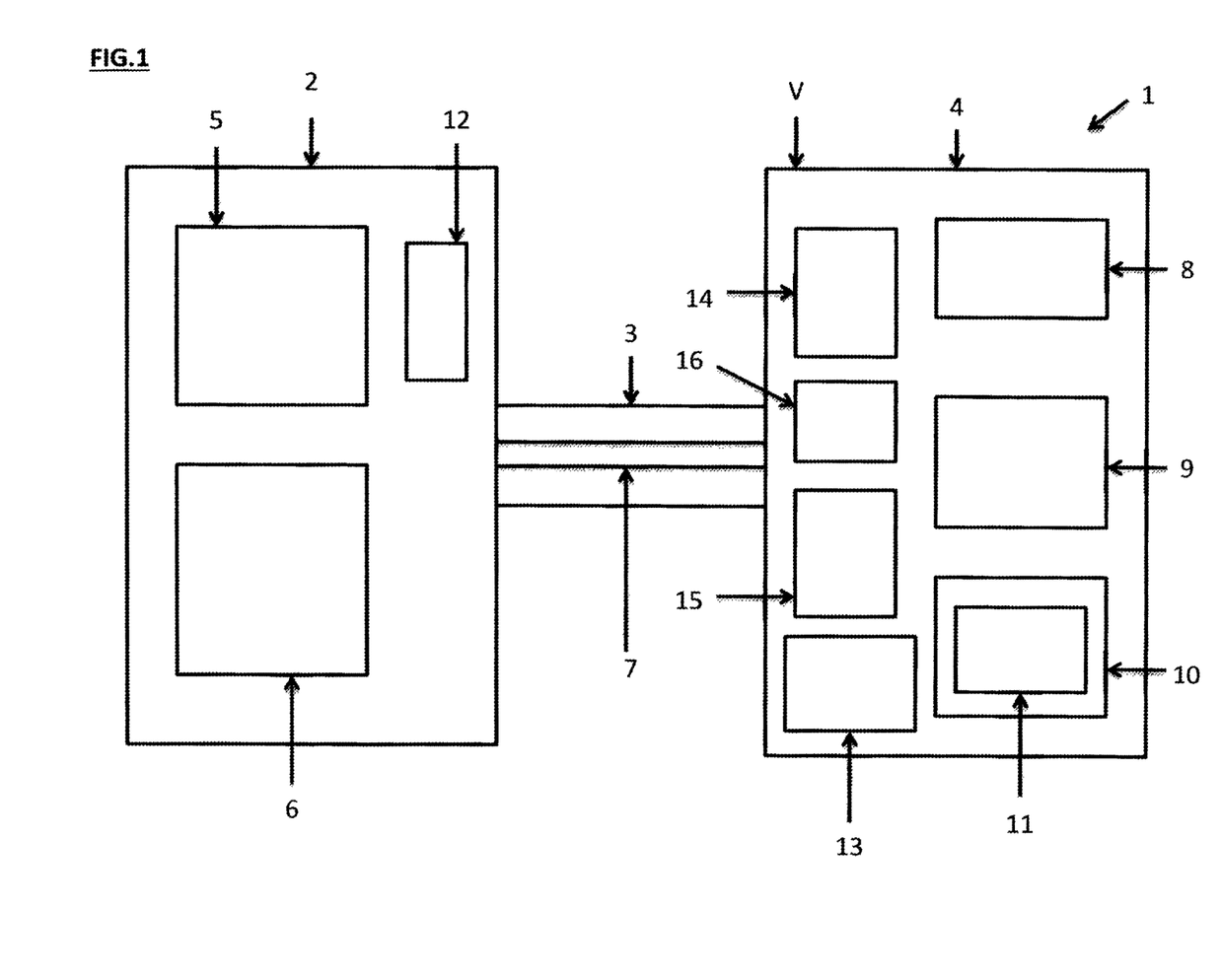
FIG. 1 illustrates a system for the safe visualization of a safety-relevant information according to a first embodiment.

FIG. 1 illustrates a system 1 for the safe visualization of safety-relevant information according to a first embodiment.

The shown system 1 comprises a first means 2, a second means 3 and a third means 4.

Therein, the shown first means 2 comprises a decomposition means 5 for performing for all possible states of at least one variable input parameter decomposition of a safe visualization of the least one variable input parameter into its safe base elements, the safe overlays and an enumerating, transforming and storing means 6 for enumerating, optionally transforming and then storing all possible states of each overlay, in particular a set of all possible states of base element visualization.

The shown second means 3 comprises a transmitting means 7 for transmitting the stored possible states of each overlay from the first means 2 to the third means 4. Therein, the transmitting means 7 can for example be a storage volume, such as a USB stick, an SD card, a NAND flash or a hard disk, or some kind of direct connection, for example Ethernet or WLAN.

Further, the shown third means 4 comprises a determining means 8 for determining the safe overlays corresponding to an actual state of the at least one variable input parameter inputted into the third means 4 and the correct state of the determined safe overlays depending on the at least one variable input parameter, and an overlaying means 9 for rendering one determined overlay after the other, one overlaying the previous. If the used color space features an alpha channel, alpha blending can be used to make the overlaying more powerful. Alpha masking can be optionally used on each overlay, regardless of the used color space. Further, the shown third means 4 comprises a displaying means 10 for displaying the resulting visualization. Therein, according to the embodiment of FIG. 1, the displaying means 10 can comprise for example a TFT display 11.

According to the embodiment of FIG. 1, the at least one variable input parameter comprises a train's current speed, wherein in a safe visualization of the train's current speed, a train's minimum speed, maximum speed and target speed are shown, too. Further, an actual state of the at least one variable input parameter V, for example a train's current speed, minimum speed, maximum speed, or target speed, is communicated to and inputted into the third means 4. Therein, the actual state of the train's current speed can originate from and be determined by a main computer, for example a computer realized train control, in compliance with common safety standards and regulations.

The shown system 1 is based on decomposing the visualization of one or multiple input parameters into its base elements. In particular, for a simple speedometer, showing for example a train's current speed, minimum speed, maximum speed and target speed, the visualization of four parameters in one rectangular area is decomposed in four comparably simple visualizations, one for each of the input parameters, thereby simplifying the problem. The sets of decomposed base element visualizations can then be safely rendered on top of each other, thereby transforming a multiplicative problem into an additive problem and thus reducing the amount of possible visualization states. In particular, separate simpler visualizations are reassembled by overlaying safe overlays to reproduce the original visualization from the simple set of base elements. Therein, the term overlay is introduced because the individual base elements usually need to be rendered on top of each other in a specific z-order to yield the original visualization, wherein one element overlays another.

Therein, rather than using checksums for each possible state of the original visualization for verification purposes, the decomposed image data can be used directly and rendered safely. In particular, the safe visualization is decomposed in the respective sources, which can already be realized at design time during a development process. Therein, one base element visualization is stored after the other thereby forming overlays, each of which is later, at runtime, displayed on top of the other, thereby generating a safe visualization of the at least one variable input parameter.

In the embodiment shown in FIG. 1, the first means 2 further comprises a first storage unit 12, in which code for a compression algorithm is stored. Therein, the enumerating, transforming and storing means 6 uses the compression algorithm stored in the first storage unit 12 for separately compressing each element of the set of all possible states of safe base element visualization prior to storing it. Further, the third means 4 comprises a second storage unit 13, in which code for a decompression algorithm, which is in particular the inverse transformation of the compression algorithm of which code is stored in the first storage unit 12, is stored and the overlaying means 9 shown in FIG. 1 is accomplished to use this decompression algorithm for decompressing the compressed elements of the set of all possible states of safe base element visualization and afterwards to successively overlay the safe base element visualizations, in particular the safe overlays corresponding to the actual state of the at least one variable input parameter, thereby generating the safe visualization of the actual state of the variable input parameter, in particular the train's speed, minimum speed, maximum speed, and target speed.

Therein, the used compression algorithm of which code is stored in the first storage unit 12 is a color lookup-table algorithm with runlength encoding, in order to successively extract and compress the respective elements.

According to the embodiment of FIG. 1, for all possible states of the at least one variable input parameter there is also non-safety critical data to be displayed, too, wherein the non-safety critical data is transmitted directly to the third means 4. Further, the third means 4 shown in FIG. 1 comprises a third nonvolatile storage unit 14 for storing for each of the decomposed safe base elements the set of all possible states of base element visualization and a fourth storage unit 15 for storing non-safety critical data. FIG. 1 also shows a safe graphics controller 16, which manages the third nonvolatile storage unit 14 as well as the fourth storage unit 15, in order to switch a graphics data stream between the non-safety critical data and the safety critical overlays. Therefore, the safe graphics controller 16 can manage the safe overlays itself, separating safe and non-safe data in display memory, and displaying safe data on top of the non-safe data.

Therein, according to the embodiment of FIG. 1, each of the elements of the set of all possible states of safe base element visualization is stored in a separate area of the third nonvolatile storage unit 14, in order to fasten the access time for reading each element of the set of extracted safety critical data from the third nonvolatile storage unit 14.

Figure 2:
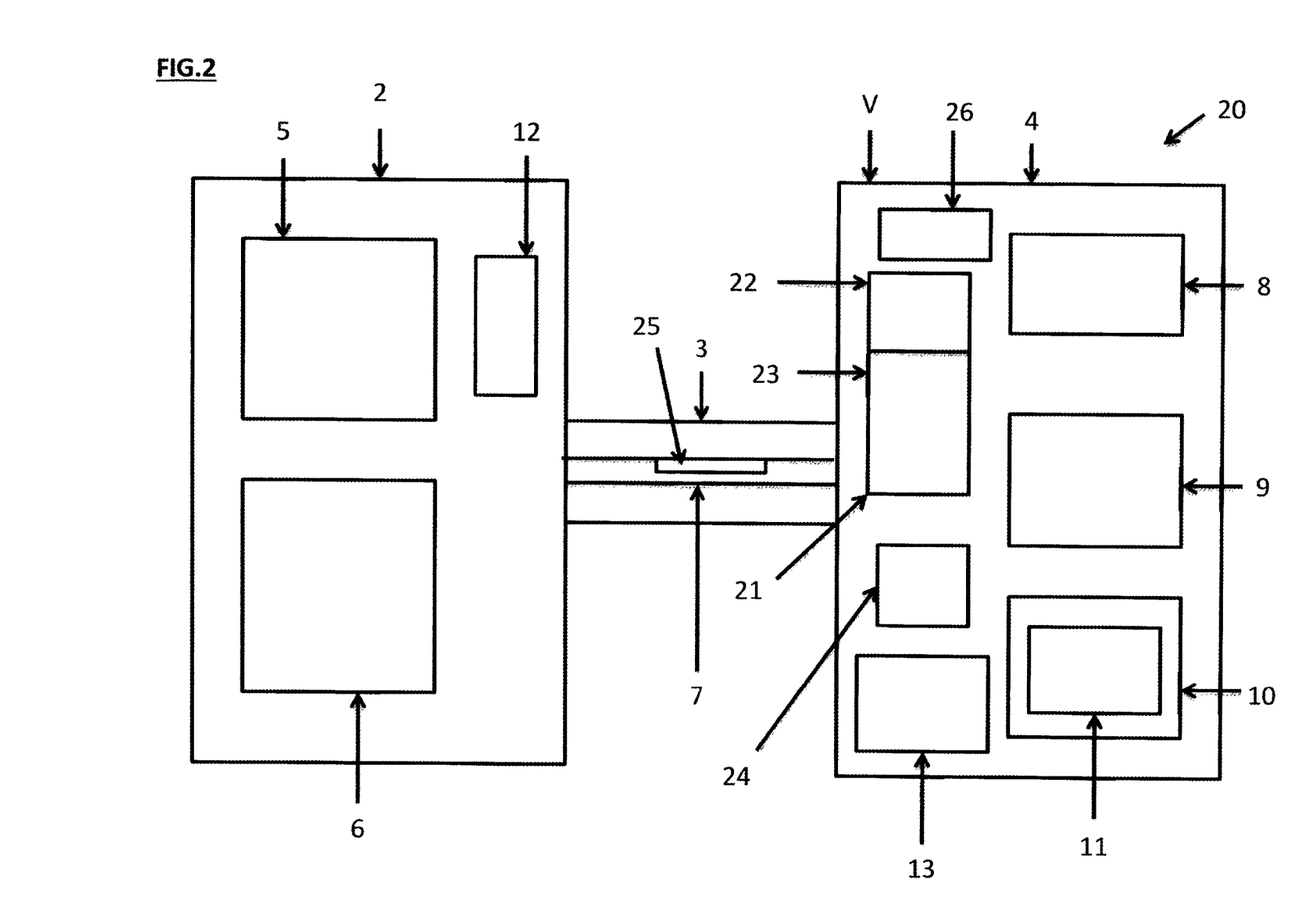
FIG. 2 illustrates a system for the safe visualization of a safety-relevant information according to a second embodiment.

FIG. 2 illustrates a system 20 for the safe visualization of safety relevant information according to a second embodiment. Therein, identical structural features as within the embodiment shown in FIG. 1 are identified by identical reference symbols.

According to the embodiment of FIG. 2, the third means 4 comprises only one unit for storing the non-safety critical data as well as the set of all possible states of safe base element visualization, in particular a fifth storing unit 21, which comprises a non-safe storage area 22 for storing the non-safety critical data and a safe storage area 23 for storing the safety critical overlays. FIG. 2 also shows a graphics controller 24 connected to the fifth storage unit 21, in order to manage the graphics data stream. In particular, the safety critical data is encrypted with an encryption key being known to the graphics controller 24 only. Therefore, the non-safe system can be a feasible supplier of safe data, adding the cost of increased computational and algorithmic complexity, but saving one hardware component. The non-safety critical data stored in area 22 might also be derived from a source that is completely external to the system.

Further, according to the embodiment of FIG. 2, the transmitting means 7 of the second means 3 comprises an inspection means 25 for performing a safety relevant inspection or verification for the stored data, e.g. by manual, semi-automatic or automatic inspection. This is meant to enhance safety, serve as a so called safety barrier, or to introduce safety by some kind of inspection, in particular a safety barrier crossing from a non-safe to a safe domain. During this inspection/verification step signatures for authenticity might be added.

Therein, the safe visualization of the actual state of the at least one variable input parameter can be generated by successively optionally inversely transforming and then rendering and overlaying the safe base elements, the overlays, of the decomposed original safety critical data, the system 20 may further comprise second inspection means 26 for performing the following: Each of the determined safe base element visualizations of the sets of all possible states of safe base element visualization corresponding to the actual state of the at least one variable input parameter is compared with a version of the respective safe base element of the set of all possible states of safe base element visualization which is effectively displayed. Further, a safety focused reaction is provided, if at least one of the determined safe base element visualizations is not identical to the version of the respective overlay of the safe base element that is effectively displayed. Therein, the comparison can be carried out in one of many suitable ways, for example by pixelwise comparison, e.g. pixel by pixel, or for relevant parts of the pixel data such as for only certain color components, or by calculating checksums of the expected and the actual overlays, and comparing the checksums, or by doing some kind of pattern matching. By checking an element of the set of all possible states of safe base element visualization against a version of the respective element of set of all possible states of safe base element visualization which is effectively displayed, if necessary admitting a tolerance, and providing a safety focused reaction if an expected overlay is not identical to the version of the respective overlay which is effectively displayed, a highly efficient and safe visualization architecture with two channels is introduced, where the forward channel does the actual visualization and the verification channel provides or enhances the integrity in a safety relevant way by comparing the current visualization with the expected visualization. If access to the separate base element renderings or overlays of the forward channel is not available to the verification channel, the verification channel can render the visualization of the at least one variable input parameter by successively rendering and overlaying the safe base elements, the overlays, of the decomposed original safety critical data into a shadow buffer, and can then compare the resulting visualization with what is actually being displayed, again by a suitable comparison means, such as some kind of pixelwise comparison, checksum comparison or pattern matching, for example.

Therein, the safety-focused reaction may be to switch the displaying means 10 off. Therein, the displaying means 10 may be switched off completely or to a certain extent. However, all methods that clearly indicate a safety critical failure to an observer are suitable as a safety-focused reaction, for example providing data marking, masking or distortion or switching off the system altogether.

Figure 3:
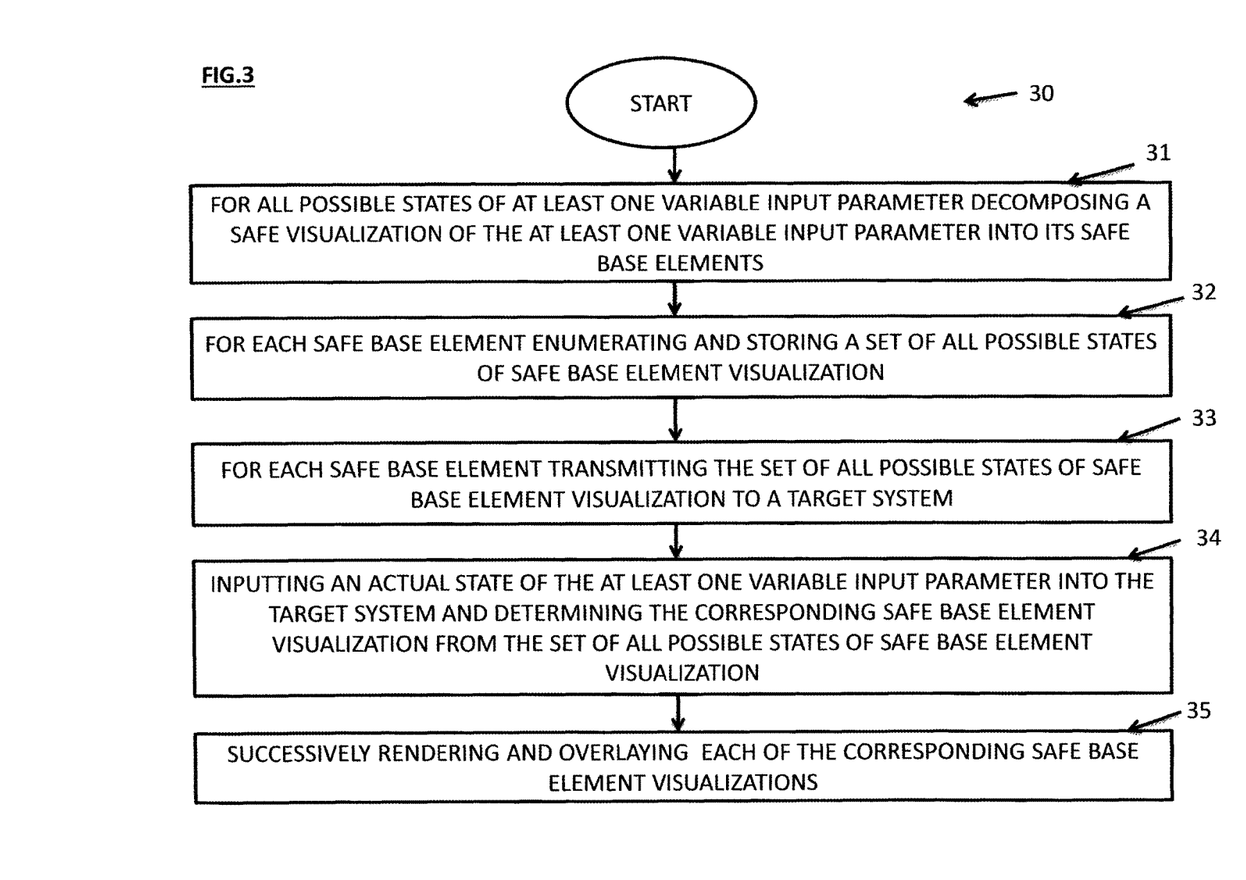
FIG. 3 illustrates a flow chart of a method for the safe visualization of a safety-relevant information according to a third embodiment.

FIG. 3 illustrates a flowchart of a method 30 for the safe visualization of safety-relevant information according to a third embodiment.

As shown in FIG. 3, in a first step 31, for all possible states of at least one variable input parameter, a safe visualization of the at least one variable input parameter is decomposed into its safe base elements, its safe overlays, wherein each of the safe base elements can either be static or represent the visualization information of at least one variable input parameter.

As further illustrated, in a second step 32, for each of the decomposed safe base elements and, therefore, for each of the safe overlays, a set of all possible states of safe base element visualization is enumerated and stored in a suitable format wherein the set of all possible states of safe base element visualization comprises the visualization of a safe base element within safe visualizations of the at least one variable input parameter for all possible states of the at least one variable input parameter. For example, assuming that the at least one variable input parameter includes a train's current speed, then all possible states of the train's current speed visualization are enumerated and stored in a suitable format.

In a third step 33, for all possible states of the at least one variable input parameter each of the decomposed safe base elements and, therefore, for each safe overlay, the set of all possible states of all safe base elements generated by decomposing the safe visualization is transmitted to a target system that provides the safe visualization at runtime.

In a fourth step 34, an actual state of the at least one variable input parameter is inputted into the target system, and for each variable input parameter the corresponding safe base element, the safe overlay, and its correct state are determined and looked up in the respective set of all possible states of safe base element visualization.

Further, as shown in FIG. 3, each corresponding safe overlay, in particular the visualization of each corresponding safe base element, is rendered from the set of all possible states of safe base element visualizations in a fifth step 35, one after the other, one overlaying the previous. This fifth step 35, in particular the rendering and overlaying of the correct safe base element state, safely generates the original safe visualization of the actual state of the at least one variable input parameter, which is then displayed on a display.

Thus, the method 30 of FIG. 3 is based on extracted image data instead of the use of checksums. In particular, the safe visualization is decomposed in the respective sources, which can already be realized during the development process. Therein, one image is extracted after the other thereby forming overlays, each of which is later, during runtime, displayed on top of the other, thereby generating a safe visualization of the at least one variable input parameter. If the used color space features an alpha channel, alpha blending can be used to make the overlaying more powerful. Alpha masking can be optionally used on each overlay, regardless of the used color space. Since an alpha mask has only one bit per pixel, it is fast and efficient to store, yet can simplify some kinds of visualization significantly, especially since the alpha mask to be applied can depend on one or more variable input parameters.

Figure 4A:
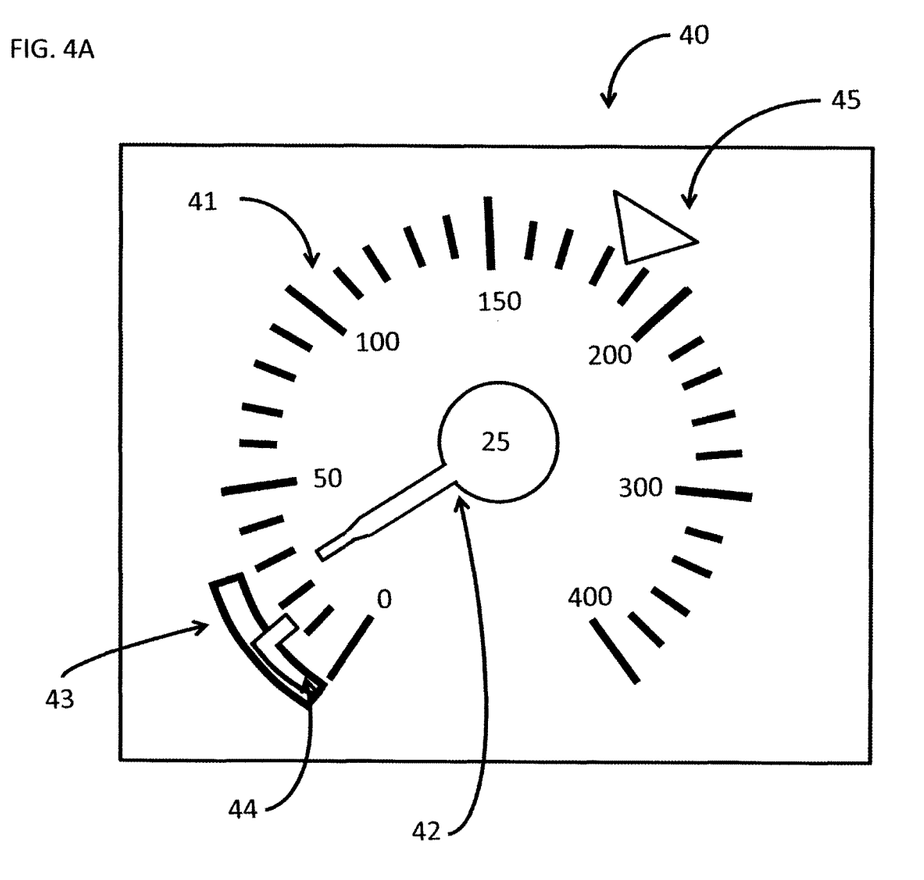
FIGS. 4A-C illustrate a safe visualization of a train's actual speed, minimum speed, maximum speed and target speed in a speedometer chart according to the present invention.
Figure 4B:
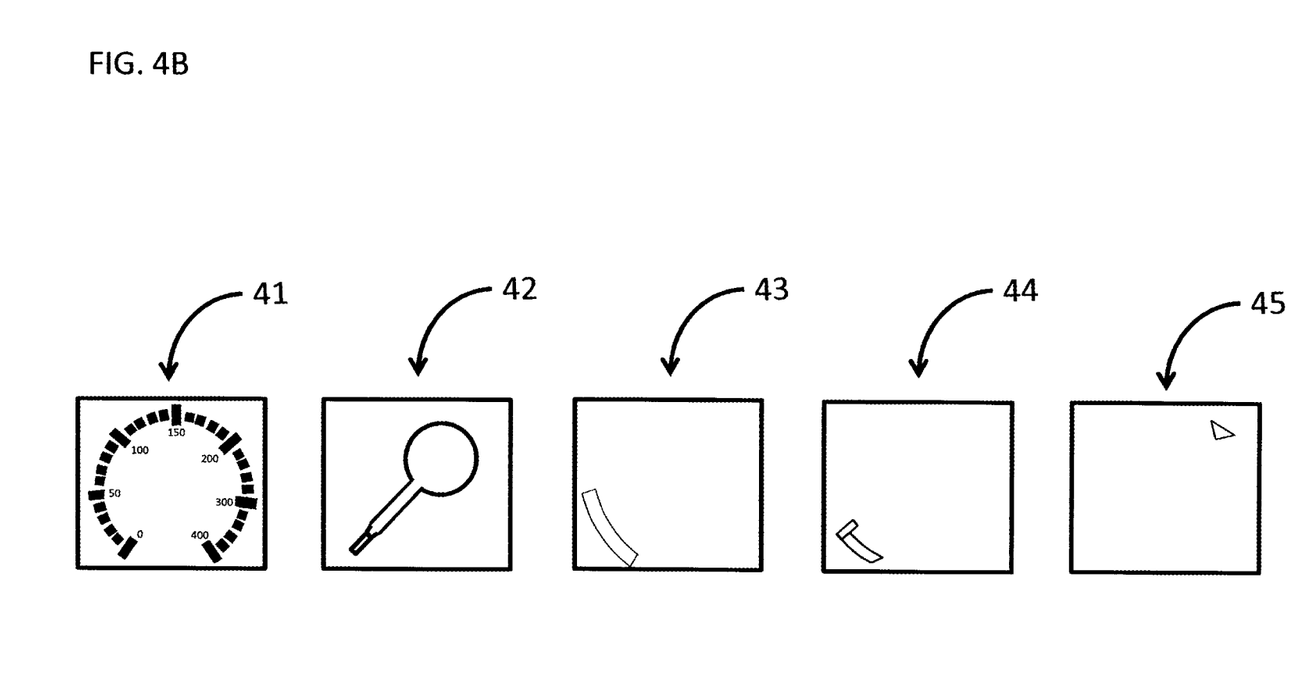
Figure 4C:
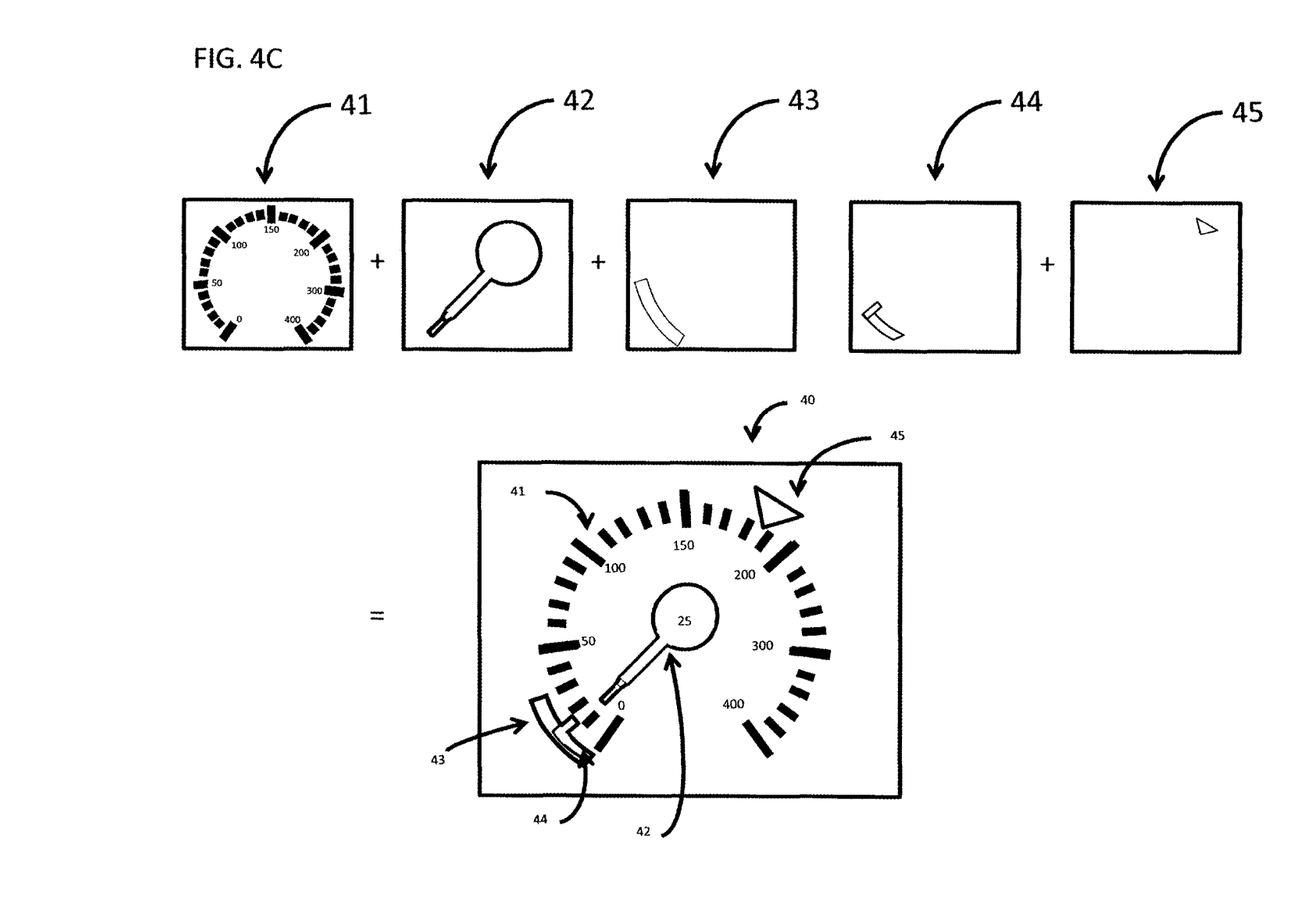

FIGS. 4 A to C illustrate a safe visualization of a train's speed in a speedometer chart according to the present invention.

In particular, FIG. 4A illustrates a speedometer chart 40 representing a train's speed.

As shown in FIG. 4A, the speedometer chart 40 comprises a base image 41 in the form of an opaque background and alphanumeric opaque information with lots of transparent pixels 42, 43, 44, 45 on the opaque background. Therein, the alphanumeric information 42, 43, 44, 45 includes a pointer 42 indicating the train's actual speed, a first bar 43 indicating a desired target speed of the train, a second bar 44 indicating the train's minimum speed and a triangle 45 indicating the train's maximum speed. Thus, FIG. 4A shows a speedometer having four sources of input. Further, the shown speedometer chart 40 complies with the requirements for a European Train Control System (ETCS).

Therein, in order to avoid a safety-relevant failure, a safe visualization of the train's current speed, minimum speed, maximum speed and target speed has to be ensured. Therein, known methods are based on the calculation of a checksum for a sequence of image data representing the train's current speed, minimum speed, maximum speed and target speed and comparing the calculated checksum to a reference checksum. Then a safety-focused reaction is provided, if the checksum is not identical to the reference checksum.

However, considering the speedometer shown in FIG. 4A, showing a train's current speed, minimum speed, maximum speed and target speed, which has four sources of input, if each of these sources has 10 bits of resolution, the speedometer would have a total of $2^{40}$ possible states. Further, if each checksum would have four bytes, the checksum data alone would amount to a total of 4 Tera bytes of checksum data, which would be much more than any current embedded system could provide.

Even if an embedded system would feature such a huge amount of memory, the pre-5 calculation of checksums would be impractical. Considering that 10 checksums could be calculated on a modern personal computer per second, it would take 3487 years to calculate $2^{40}$ checksums, which would be unacceptable.

Therefore, according to the present invention, as shown in FIG. 4B, each of the elements 41, 42, 43, 44, 45 is separately extracted thereby forming safe overlays, each of which being afterwards, during runtime, displayed on top of the other, thereby generating a safe visualization of the train's current speed, minimum speed, maximum speed and target speed. Thus, according to the present invention, the safe visualization is decomposed in the respective sources, which can already be realized during the development process. Therefore, for a simple speedometer at 24 bits pixel depth, showing for example a train's current speed, min-imum speed, maximum speed and target speed, thus having four sources of input, wherein the safety critical data are possible states of the overlays, in particular the alphanumeric in-formation 42,43,44,45, there are only $2^0+2^{10}+2^{10}+2^{10}+2^{10}$ possible states for the visuali-zation of the speedometer. Therefore, considering 25 k bytes for the compressed base image and roughly 3 k bytes compressed data per overlay, a total storage of 25 k bytes+$2^{10}*3$ k bytes+$2^{10}*3$ k bytes+$2^{10}*3$ k bytes+$2^{10}*3$ k bytes and, therefore, a total amount of 12M bytes is required, which is about 333333 times better than a total amount of 4 Tera bytes of checksum data. Further, indeed the extraction of image data may take longer than the calculation of checksums, but considering a personal computer executing 1 extraction per second, a computing time of 4097 seconds is required for the extraction of all data, which is much better than a computing time of 3487 years for calculating $2^{40}$ checksums. Therefore, an improved method for the safe visualization of safety-relevant information on a display concerning storage requirement and computational time is provided.

FIG. 4C illustrates the step of successively overlaying the extracted elements 41, 42, 43, 44, 45, thereby generating the safe visualization 40 of the actual speedometer chart.

Figure 5A:
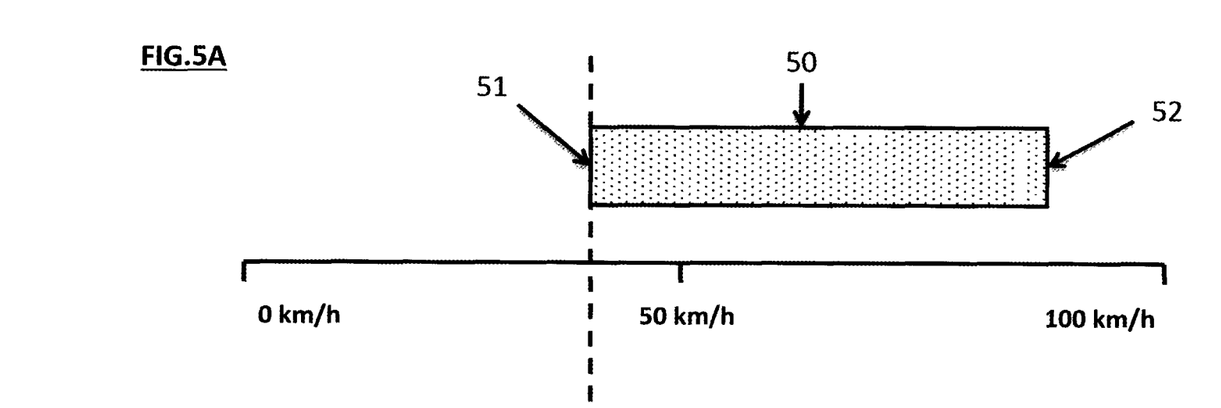
FIGS. 5A and B illustrate the use of alpha masking according to the present invention.
Figure 5B:
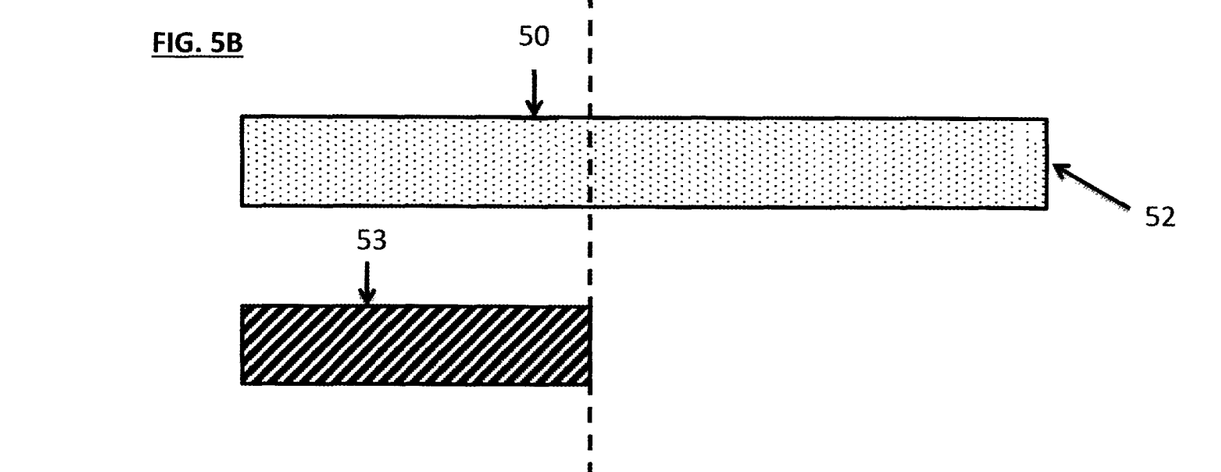

FIGS. 5A and B illustrate the use of alpha masking according to the present invention.

In particular, FIG. 5A illustrates a bar 50 indicating a train's target speed area, wherein a left border 51 of the bar 50 indicates a train's minimum speed value of roughly 40 km/h and a right border 52 of the bar 50 illustrates the train's maximum speed value of roughly 80 km/h.

Therefore, the shown bar 50 depends on two variable input parameters. Thus, even if this bar 50 would be a separate safe base element and, therefore, a safe overlay, the train's minimum speed value and the train's maximum speed value could not be separated from each other, and the number of their states would multiply.

Therefore, an additional binary alpha mask can be used per overlay, in particular a 1-bit per pixel alpha mask. Therein, a binary alpha mask denotes a deletion mask which is applied per overlay. Therein, one bit in the alpha mask corresponds to one pixel in the overlay, wherein if the bit is 0 then the corresponding pixel will simply be treated as if it would have an A value of 0.

FIG. 5B illustrates a decomposition of the bar 50 by means of alpha masking.

As shown in FIG. 5B, using alpha masking the bar 50 can be visualized depending on the train's maximum speed value and a corresponding alpha mask 53 is dependent on the train's minimum speed. First, the bar is drawn from 0 km/h to 80 km/h, and then the alpha mask 53 is applied to delete the part from 0 km/h to 40 km/h, yielding the intended visualization of a bar ranging from 40 km/h to 80 km/h. Since the visualization is decomposed in two steps, the states add rather than multiply.

That which is claimed is:

1. A method for safe visualization of safety-relevant information, the method comprising the steps of:
   for all possible states of at least one variable input parameter, decomposing a safe visualization of the at least one variable input parameter into its safe base elements;
   for each of the safe base elements, enumerating and storing a set of all possible states of safe base element visualization;
   for each of the safe base elements, transmitting the set of all possible states of safe base element visualization to a target system that provides safe visualization at runtime;
   for each of the at least one variable input parameter inputting an actual state of the at least one variable input parameter into the target system and, for each of the at least one variable input parameter, determining a corresponding safe base element visualization corresponding to the actual state of the at least one variable input parameter and its correct state from the set of all possible states of safe base element visualization; and
   successively rendering and overlaying each of the corresponding safe base element visualizations on top of each other on a displaying means of the target system, thereby generating a safe visualization of the actual state of the at least one variable input parameter;
   whereby a safe visualization problem is approached as an additive representation that reduces states of visualization as compared to a multiplicative representation, thereby also reducing memory storage requirements and computing time to perform the safe visualization as compared to the multiplicative representation.

2. The method according to claim 1, wherein the step of enumerating and storing a set of all possible states of safe base element visualization for each of the safe base elements comprises transforming each element of the set of all possible states of safe base element visualization into a suitable format prior to storing the safe base elements, and wherein the step of successively rendering and overlaying each of the corresponding safe base element visualizations on top of each other on a displaying means of the target system, thereby generating a safe visualization of the actual state of the at least one variable input parameter comprises using a respective inverse transformation.

3. The method according to claim 2, wherein the step of transforming each element of the set of all possible states of safe base element visualization into a suitable format comprises using a compression algorithm and wherein the respective inverse transformation is a respective decompression algorithm.

4. The method according to claim 3, wherein the compression algorithm is a color lookup-table algorithm with runlength encoding.

5. The method according to claim 2, wherein the step of transforming each element of the set of all possible states of safe base element visualization into a suitable format comprises transforming each of the elements of the set of all possible states of safe base element visualization into a vector graphics format and wherein the respective inverse transformation used in the step of successively rendering and overlaying each of the corresponding safe base element visualizations on top of each other on a displaying means of the target system, thereby generating a safe visualization of the actual state of the at least one variable input parameter comprises interpreting the vector graphics format.

6. The method according to claim 1, wherein the step of enumerating and storing a set of all possible states of safe base element visualization for each of the safe base elements comprises the step of storing the set of all possible states of safe base element visualization in a color space.

7. The method according to claim 1, wherein for all possible states of the at least one variable input parameter the safe visualization of the at least one variable input parameter comprises non-safety critical data, wherein the non-safety critical data is transmitted to the target system and wherein the step of successively rendering and overlaying each of the corresponding safe base element visualizations on top of each other on a displaying means of the target system, thereby generating a safe visualization of the actual state of the at least one variable input parameter comprises:
rendering and displaying the non-safety critical data; and
successively overlaying the displayed non-safety critical data with each of the corresponding safe base element visualizations.

8. The method according to claim 1, wherein the step of enumerating and storing a set of all possible states of safe base element visualization for each of the safe base elements comprises the step of storing the set of all possible states of safe base element visualization in an RGBA color space which in particular features an alpha channel, and wherein the step of successively rendering and overlaying each of the corresponding safe base element visualizations on top of each other on a displaying means of the target system, thereby generating a safe visualization of the actual state of the at least one variable input parameter comprises using alpha blending.

9. The method according to claim 1, wherein the step of enumerating and storing a set of all possible states of safe base element visualization for each of the safe base elements comprises using alpha masking, and wherein the step of successively rendering and overlaying each of the corresponding safe base element visualizations on top of each other on a displaying means of the target system, thereby generating a safe visualization of the actual state of the at least one variable input parameter comprises using alpha masking to generate the safe base element visualization.

10. The method according to claim 1, wherein the step of enumerating and storing a set of all possible states of safe base element visualization for each of the safe base elements comprises using a non-static z-order and wherein the step of successively rendering and overlaying each of the corresponding safe base element visualizations on top of each other on a displaying means of the target system, thereby generating a safe visualization of the actual state of the at least one variable input parameter comprises using the non-static z-order to generate the safe base element visualization.

11. The method according to claim 1, wherein the step of transmitting the set of all possible states of safe base element visualization to a target system that provides safe visualization at runtime for each of the safe base elements, comprises at least one of assuring integrity of transmitted data and adding one of a manual inspection step, a semi-automatic inspection step, and an automatic inspection step to enhance safety integrity of the data.

12. The method according to claim 1, wherein the method further comprises the steps of:
comparing each of the corresponding safe base element visualizations with a displayed version of the corresponding safe base element;
providing a safety focused reaction, if one of the corresponding safe base element visualizations is not identical to the displayed version of the corresponding safe base element.

13. The method according to claim 12, wherein the safety focused reaction comprises switching the displaying means of the target system off.

14. A system for safe visualization of safety-relevant information comprising:
a first means, which comprises
a decomposition means for performing for all possible states of at least one variable input parameter decomposition of a safe visualization of the at least one variable input parameter into its safe base elements, and
an enumerating, transforming and storing means for performing, for each of the safe base elements, enumeration and storage of a set of all possible states of safe base element visualization;
a second means, which comprises a transmitting means; and
a third means for providing safe visualization at runtime, the transmitting means of the second means transmitting, for each of the safe base elements, the set of all possible states of safe base element visualization to the third means, wherein for each of the at least one variable input parameter an actual state of the at least one variable input parameter is inputted into the third means, and wherein the third means comprises
a determining means for determining, for each of the at least one variable input parameter, a corresponding safe base element visualization corresponding to the actual state of the at least one variable input parameter and its correct state from the set of all possible states of safe base element visualization, and
an overlaying means for successively rendering and overlaying each of the corresponding safe base element visualizations on top of each other on a displaying means of the third means, thereby generating a safe visualization of the actual state of the at least one variable input parameter;
whereby the system is configured to approach a safe visualization problem as an additive representation that reduces states of visualization as compared to a multiplicative representation, thereby also reducing memory storage requirements and computing time to perform the safe visualization as compared to the multiplicative representation.

15. The system according to claim 14, wherein for all possible states of the at least one variable input parameter the safe visualization of the at least one variable input parameter comprises non-safety critical data, wherein the non-safety critical data is transmitted to the third means by the transmitting means and wherein the third means comprises a means for incorporating the non-safety critical data in visualization data being displayed on the displaying means.

16. The system according to claim 15, wherein the third means comprises a third storage unit for storing for each of the safe base elements the set of all possible states of safe base element visualization, a fourth storage unit for storing the non-safety critical data and a graphics controller for managing the third storage unit and the fourth storage unit by switching a data stream between the third storage unit and the fourth storage unit in such a way, that the non-safety critical data can be rendered and displayed first and is then successively overlaid with each of the corresponding safe base element visualizations.

17. The system according to claim 15, wherein the third means comprises a fifth storage unit, which comprises a safe storage area for storing for each of the safe base elements the set of all possible states of safe base element visualization and a non-safe storage area for storing the non-safety critical data and a graphics controller for managing the fifth storage unit by switching a data stream between safe storage area of the fifth storage unit and the non-safe storage area of the fifth storage unit in such a way, that the non-safety critical data can be rendered and displayed first and is then successively overlaid with each of the corresponding safe base element visualizations.

18. The system according to claim 14, wherein the first means, the second means and the third means are combined into one computing unit.

* * * * *